Figure 1:
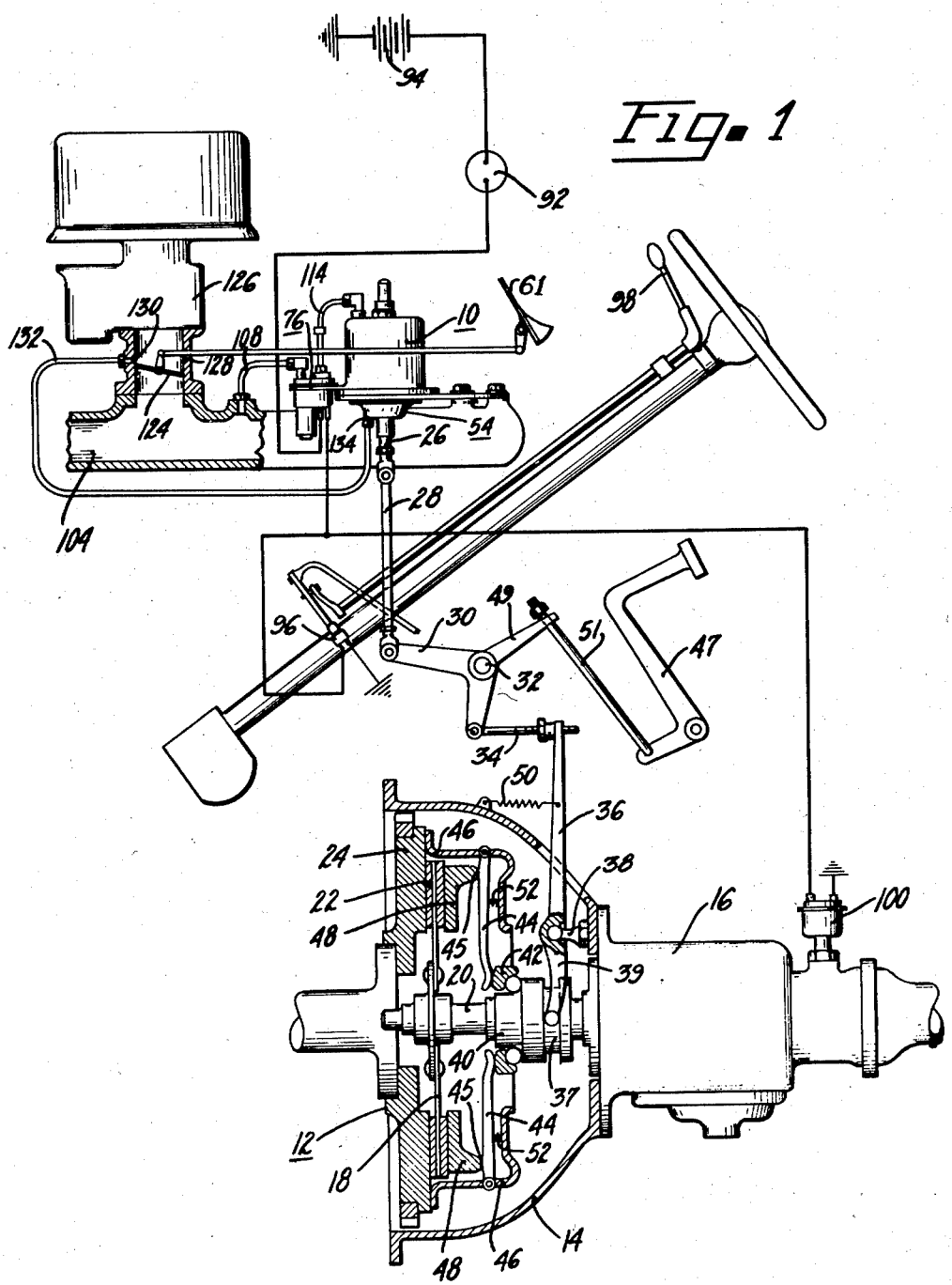

Aug. 1, 1950

H. W. PRICE

2,517,025

CLUTCH CONTROL MECHANISM

Filed Nov. 20, 1943

3 Sheets-Sheet 1

INVENTOR
HAROLD W. PRICE
BY
H. O. Clayton

INVENTOR
HAROLD W. PRICE
BY
H. O. Clayton

Patented Aug. 1, 1950

2,517,025

UNITED STATES PATENT OFFICE 2,517,025

CLUTCH CONTROL MECHANISM

Harold W. Price, South Bend, Ind., assignor to Bendix Aviation Corporation, South Bend, Ind., a corporation of Delaware Application November 20, 1943, Serial No. 511,085

6 Claims. (Cl. 192—.052)

This invention relates in general to power means for operating the friction clutch of an automotive vehicle and in particular to such means operative to effect both the disengagement and engagement of a friction clutch which is devoid of yieldable means for maintaining the driving and driven members of the clutch in engagement with each other. Such yieldable means is of course one of the principal parts of the conventional friction clutch. In short my invention relates to power means for operating a friction clutch to effect both an engagement and disengagement of said clutch.

One of the objects of my invention is to provide, in an automotive vehicle comprising a vehicle speed responsive governor, a friction clutch devoid of means for engaging the clutch, an accelerator, and a transmission and clutch controlling shift lever, a pressure differential and spring operated double-acting motor unit operable at the will of the driver, by his operation of the accelerator and shift lever, to effect an operation of the clutch.

Yet another object of the invention is to provide, in the power plant of an automotive vehicle, power means for moving the driven element of a friction clutch into and out of engagement with the driving element of said clutch thereby effecting respectively an engagement and disengagement of said clutch, said power means including a pressure differential and spring operated double-acting motor unit consisting of two separate motors and further including valve means for controlling the operation of said motor unit, said means including the accelerator operated throttle of the carburetor of the vehicle and further including a three-way valve controlled both by the gear shift lever of the vehicle and a vehicle speed responsive governor.

My invention also comprehends the provision of a friction clutch control mechanism for an automotive vehicle said mechanism including a pressure differential and spring operated motor unit operably connected to a friction clutch of the aforementioned type, said motor unit including two separate motors, one of said motors being controlled by an operation of the carburetor throttle valve of the vehicle and operative to effect a so-called first stage of engagement of the clutch and the other motor being controlled by said carburetor throttle valve and by either the shift lever of the vehicle or a vehicle speed responsive governor and operative to effect a so-called second stage of engagement of the clutch.

Yet another object of my invention is to provide power means, including a pressure differential and spring operated motor unit, for effecting an engagement of a friction clutch including a driving element and a driven element, said power means further including spring means operative to effect a separation of said clutch elements that is a disengagement of said friction clutch.

A further object of my invention is to provide power means for effecting a smooth engagement of an automotive friction clutch when the accelerator of the vehicle is suddenly depressed to start the car in motion.

Figure 2:
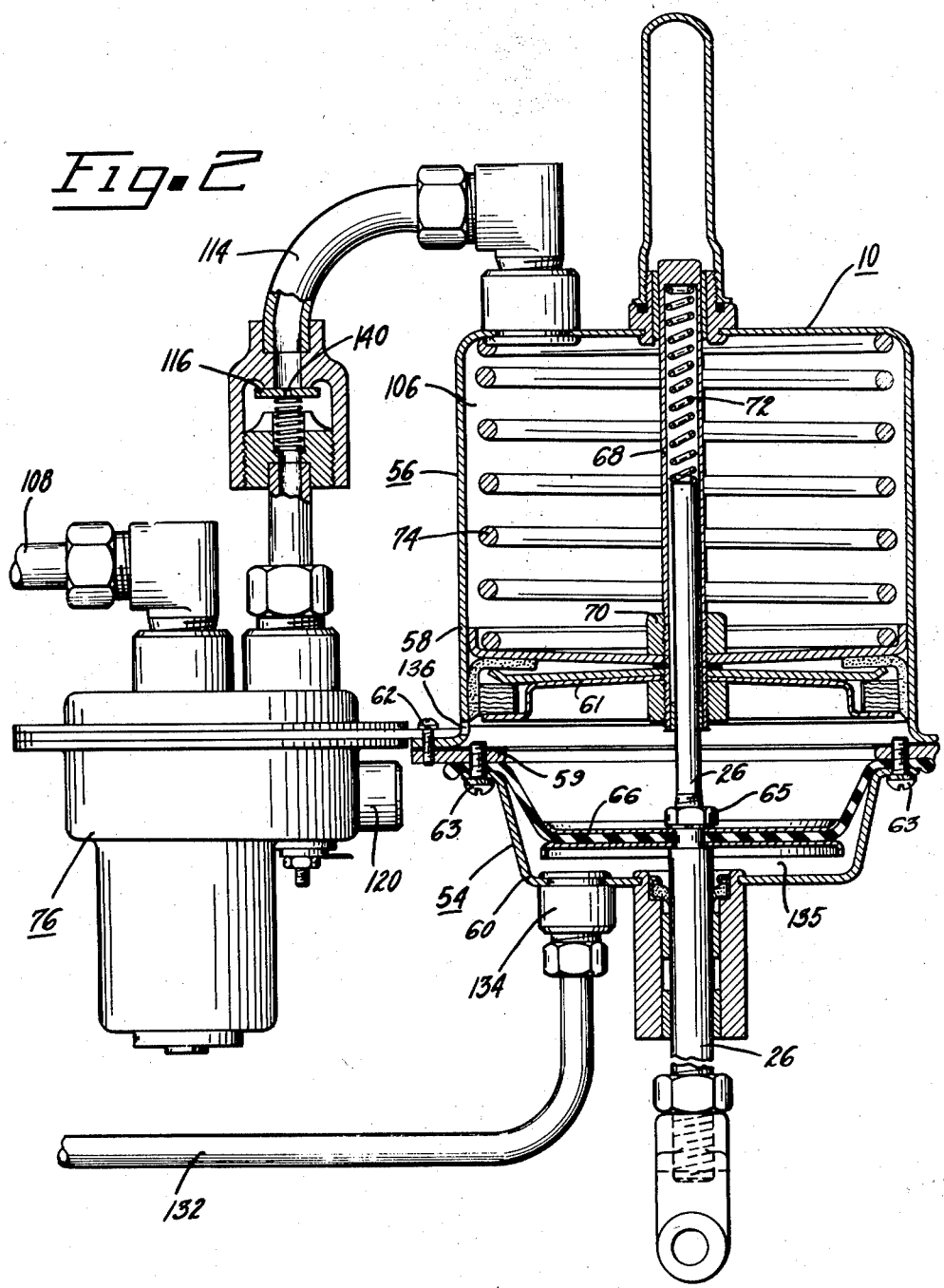
Figure 3:
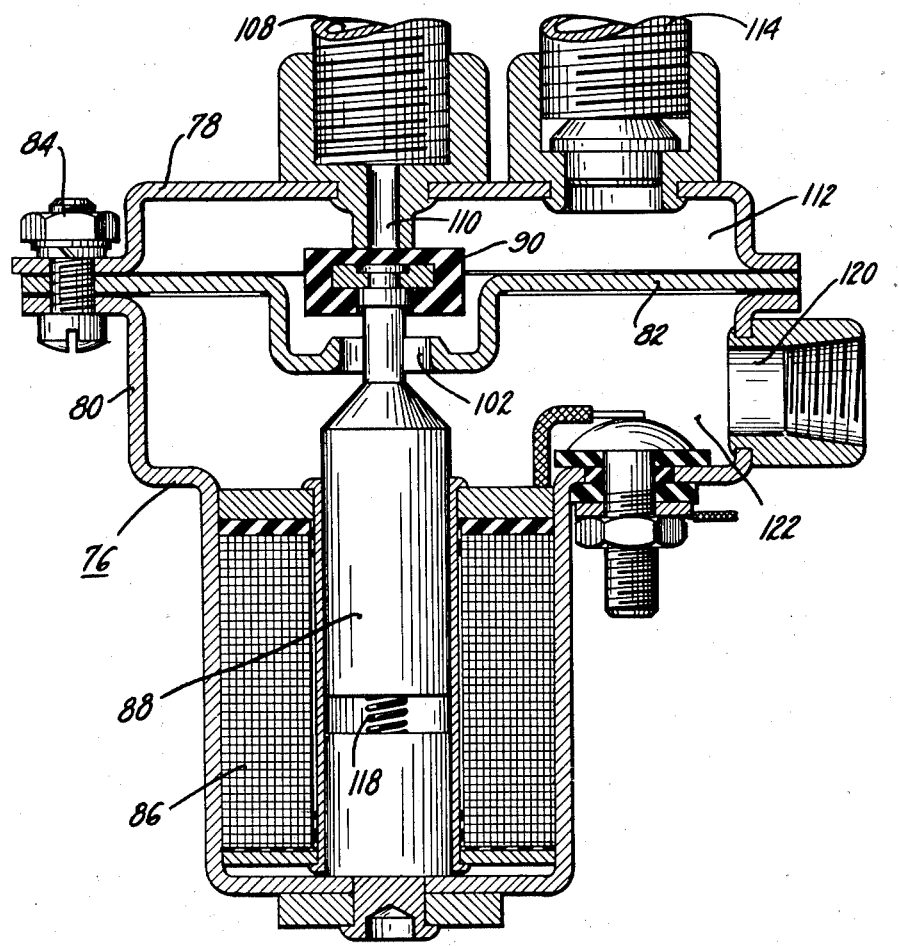

Other objects of the invention and desirable details of construction of parts will become apparent from the following detailed description of a single embodiment of the invention, taken in conjunction with the accompanying drawings illustrating said embodiment, in which:

Figure 1 is a diagrammatic view disclosing the features of the friction clutch and the clutch operating power means constituting my invention;

Figure 2 discloses in section the clutch operating pressure differential and spring operated motor unit of my invention together with a portion of the valve mechanism for controlling the operation of said unit; and Figure 3 is a longitudinal sectional view of the valve mechanism disclosed in Figure 2.

Referring now to Figure 1 disclosing a preferred embodiment of the combined friction clutch and clutch operating power means constituting my invention a clutch operating double-acting pressure differential and spring operated motor unit 10, shown in detail in Figure 2, is connected to a friction clutch 12, Figure 1, said clutch being distinguished by the absence of the usual clutch springs. This clutch includes a casing 14 fixedly mounted on the casing of a change speed transmission 16 said transmission being drivably connected to the driven member 18 of the clutch by means including a shaft 20. This driven member of the clutch is provided at its outer periphery with the usual friction mat 22 one face of said mat being movable into engagement with the inner face of a clutch driving member 24 which is drivably connected to the internal combustion engine of the vehicle, not shown. Now the clutch driven member 18 is preferably so constructed that the mat 22 moves slightly away from the clutch driving member 24 when the clutch operating power means of my invention is rendered operative to disengage the clutch.

Describing now the force transmitting means interconnecting the driven clutch member 18 with the power elements of motor unit 10, said means includes a connecting rod 26, Figure 2, adjustably connected to a link 28. This link is pivotally connected to one end of one arm of a crank member 30 pivotally mounted, that is fulcrumed, upon a fixedly mounted pin 32. The end of another arm of the crank member 30 is pivotally connected to a link 34 which is adjustably connected to one arm of a lever 36. This lever is fulcrumed upon the rounded end of a stud 38 which is fixedly secured to the clutch casing member 14. The lower arm 39 of the lever 36 preferably lies within a slotted portion 37 of a thrust member 40 sleeved over and slidably mounted upon the shaft 20. A thrust ring 42 mounted on the thrust member 40 is at all times in contact with crank members 44 pivotally mounted upon a clutch housing member 46 secured to the clutch driving member 24. The cranks 44 may be pivotally connected at 45 with a thrust plate 48 contactable with the outer face of the friction mat 22; or the cranks 44 may be in disconnected engagement with said thrust plate thereby permitting the mat 22 to move out of engagement with the driving clutch element 24 when the clutch operating power means of my invention is operative to disengage the clutch.

A tension spring 50 interconnecting the clutch casing 14 and the lever 36 and tension springs 52 interconnecting the cranks 44 and casing member 46 constitute the principal parts of the power means for effecting a disengagement of the clutch that is the movement of the mat 22 of the driven clutch member away from the clutch driving member 24. A foot operated clutch pedal 47, connected to an arm 49 of the crank member 30 by a link 51, serves as a means to make possible a disengagement of the clutch in the event of failure of the springs 52 and the spring 50.

Referring now to Figure 2 disclosing the principal feature of my invention that is the pressure differential and spring operated motor unit 10, this unit consists of two separate motors, a so-called first stage clutch engaging motor 54 and a clutch engaging motor 56; and as will be described hereinafter the latter motor also serves as a part of the power means for effecting a disengagement of the clutch.

The motor unit 10 includes a cup shaped casing member 58 and a ring 59 secured together by bolts 62 the member 58 together with a piston 61 constituting the motor 56 and a casing member 60 together with a diaphragm power element 66 constituting the motor 54. The casing member 60 and the power element 66 are secured together by bolts 63. The connecting rod 26 is secured to the power element 66 by a nut 65 and the upper portion of said element is telescoped within a hollow rod 68 which is threadedly connected to the hub portion 70 of said piston. The upper end of the connecting rod 26 contacts a compression spring 72 housed within the rod 68, said spring serving to make the connection between the piston 61 and the driven clutch element a yieldable one. A compression spring 74, interposed between the piston 61 and the upper end, Figure 2, of the cup shaped member 58 is one of the principal parts of the motor unit 10 in its operation of effecting an engagement of the clutch.

The motor 56 of the motor unit 10 is controlled in part by a solenoid operated three-way valve unit 76 disclosed in detail in Figure 3, said unit comprising casing members 78 and 80 and a disk member 82 detachably secured together by suitable fastenings such as bolts 84. The casing members house a solenoid including a winding 86 and an armature 88; and a valve member 90 is connected to one end of said armature. As disclosed in Figure 1 the solenoid winding 86 is wired in series with the ignition switch 92 of the ignition system of the car, a grounded battery 94 and a grounded breaker switch 96. The latter switch is operated by the shift lever 98 of the car, said switch, and the force transmitting means interconnecting the switch with the shift lever, being so constructed and the parts thereof so arranged that the switch is closed during the first increment of movement of the shift lever and opened during the last increment of movement of said lever. The winding 86 is also wired in series with the battery, ignition switch and a grounded vehicle speed responsive governor operated switch 100. Therefore it follows that the switches 96 and 100 are in parallel in the electrical circuits. The governor operated switch 100 is closed by the governor when the speed of the car is reduced to or below a certain factor.

Briefly describing the operation of the unit 76 when the solenoid is energized, by either reducing the speed of the car below governor speed or by moving the shift lever to operate the transmission 16, then the valve member 90 is seated to cover an opening 102 in the disk member 82 thereby interconnecting the intake manifold 104 of the engine with a control chamber 106 of the motor 56. Tracing this air transmitting connection the same includes a conduit 108 interconnecting the manifold with the valve unit 76, a duct 110 in said unit, a chamber 112 in said unit, and a conduit 114 interconnecting the chambers 106 and 112. The conduit 114 has incorporated therein a spring and pressure differential operated check valve 116 the operation of which is described hereinafter. When the solenoid of the unit 76 is deenergized a spring 118 within said unit functions to seat the valve member 90 to cover the end of the duct 110 thereby venting the motor chamber 106 to the atmosphere via a port 120 in the unit 76, a chamber 122 in said unit, the opening 102, the chamber 112 and the conduit 114.

Describing now the valve means for controlling the motor 54 and in part controlling the motor 56 the principal part of said valve means is simply the throttle or so-called butterfly valve 124 of the carburetor 126 of the vehicle. The other part of this control valve means constitutes a small part of the body section 128 of the carburetor said part being provided with an opening 130; and this opening registers with one end of a conduit 132. This conduit is connected at its other end with a hollow nipple 134 connected to the casing 60 of the motor 54. When the accelerator 61 is completely released to thereby completely close the throttle valve 124 as disclosed in Figure 1 then the edge of said valve adjacent the opening 130 lies below said opening accordingly the gaseous pressure at said opening and within the conduit 132 is atmospheric or substantially so; and it follows therefore that the gaseous pressure within a control chamber 135 of the motor 54 is at this time atmospheric or substantially so. The motor 54 is then said to be deenergized. Now when the accelerator is depressed to open the throttle valve 124 the aforementioned edge portion of said valve is moved clockwise that is in the direction of the arrow, Figure 1, to a position above the opening 130 resulting in a relatively rapid flow of air through the body sections 128 and the Venturi effect of this flow of air across the inner end of the opening 130 results in a flow of air through the conduit 132 from the chamber 135 to partially evacuate said chamber. Now the degree of vacuum created in the chamber 135 is directly proportional to the rate of flow of air through the air induction conduit 128, and this rate of flow of air is determined in large measure by the speed of the engine and the degree of opening of the throttle valve 124. Explaining the creation of this clutch engaging force when the chamber 135 is partially evacuated the motor 54 is energized for the power element 66, is then subjected to a differential of pressures, said element being subjected to the pressure of the atmosphere on its upper side via a vent port 136 in the casing member 58 and a pressure less than atmosphere on its lower side.

Describing now the operation of the mechanism constituting my invention, when the car is at a standstill and the internal combustion engine is idling then the clutch is disengaged; for at this time the throttle valve 124 is in its closed position as disclosed in Figure 1 thereby creating, by virtue of the pumping action of the pistons of the engine, a partial evacuation of the intake manifold 104. It follows therefore that the control chamber 106 of the motor 56 is likewise partially evacuated inasmuch as the valve member 90 is at the time positioned to interconnect said chamber with the manifold; for it will be remembered that when the car is at a standstill the governor operates to close the switch 100 which results in an energization of the solenoid of the unit 76.

Now when the control chamber 106 is partially evacuated the motor 56 is energized by vacuum resulting in a movement of the power element 61 upwardly to compress the spring 74; and this operation, together with a deenergization of the motor 54, makes possible an operation of the spring 50 and the springs 52 to effect a disengagement of the clutch. As to the deenergization of the motor 54 this is effected as explained above, when the throttle valve 124 is closed.

The clutch having been disengaged by the slight separation of the driving and driven elements of the clutch, the driver will then probably operate the selector lever 98 to establish the transmission 16 in its low gear setting and this having been done he will then depress the accelerator, not shown, to open the throttle valve 124 to effect both a speeding up of the engine and an engagement of the clutch.

Describing in detail the latter operation the first stage of engagement of the clutch, that is the forcing of the mat 22 of the driven clutch element 18 into engagement with the driving clutch element 24, is effected, with a normal operation of the accelerator, solely by the energization of the motor 54; for as previously described when the throttle valve 124 is opened said motor is energized the degree of said energization being directly proportional to the rate of flow of air past the opening 130. Now inasmuch as the clutch elements are only slightly separated when the clutch is disengaged it follows that said elements are relatively quickly brought into engagement to start the car in motion; and the acceleration of the car is increased as the loading of the clutch plates is increased with a speeding up of the engine. As described above, the clutch plate loading is directly proportional or substantially directly proportional to the energization of the motor 54 and said energization is dependent upon two variables, the engine speed and the throttle opening.

When the car speed reaches the so-called governor speed, that is the speed of the car at which the governor operates to open the switch 100, then the second stage of clutch engaging operation of the clutch control mechanism is initiated; for when the switch 100 is opened the solenoid of the unit 76 is deenergized to move the valve member 90 to the position disclosed in Figure 3 thereby admitting atmosphere at a fixed rate into the chamber 106. This fixed rate is effected by an opening 140 in the check valve 116. The motor 56 is then energized as a result of the expansion of the spring 74 the rate of said expansion, to increase the loading of the clutch members, being constant by virtue of the fixed rate of bleed of air into the chamber 106. There is thus effected the second and final stage of engagement of the clutch to completely load the clutch elements in contact with each other and thereby prevent a slipping of the clutch.

Should the driver depart from a normal operation of the accelerator by depressing the same very suddenly to its wide open throttle position then the motor 56 becomes the sole means for effecting the engagement of the clutch; for with such an operation of the accelerator, which is usually effected in starting the car from rest, the energization if any of the motor 54 is insufficient to effect a loading of the clutch elements. The motor 56 is then spring energized to progressively increase the loading of such elements to get the car under way.

Describing this operation in detail with a sudden opening of the throttle the manifold vacuum is suddenly dropped and the gaseous pressure within said manifold increases to atmospheric or substantially so. Air is thus bled into the chamber 106 to effect the aforementioned spring energization of the motor 56, via the connection between the manifold and said chamber it being remembered that with the above operation the check valve 116 is closed as disclosed in Figure 2.

After the vehicle is under way in low gear above governor speed and the desired vehicle speed is reached the driver, to successively disengage the friction clutch and establish the transmission in a higher gear ratio, needs but to first release the accelerator and then move the shift lever to the desired position. As described above the first increment of movement of said lever serves to close the switch 96 thereby effecting a disengagement of the clutch. Then after the transmission is established in gear and the driver removes his hand from the shift lever said removal will, by virtue of the opening of the switch 96, serve to initiate the second stage clutch engaging operation of the motor 56. The driver however probably does not delay the depression of the accelerator accordingly the so-called first stage engagement of the clutch is probably well under way or completed before the spring 74 has completed its operation of loading the clutch elements.

There is thus provided a simple power means for operating the friction clutch of an automotive vehicle, said clutch being devoid of the usual springs for maintaining the clutch engaged. The disengagement of the clutch is effected by releasing the accelerator together with either a slowing down of the vehicle to its governor speed or a gear changing operation of the selector lever; and the engagement of the clutch is effected by depressing the accelerator together with either a removal of the hand from the shift lever after a gear shift movement thereof or an increase in the speed of the vehicle above its governor speed. It is to be particularly noted that a smooth engagement of the clutch is effected inasmuch as with the mechanism of my invention the loading of the driving and driven clutch elements is, with a normal operation of the accelerator, proportional to the speed of the engine and degree of the opening of the throttle valve. In other words with the clutch control mechanism of my invention the loading of the clutch elements is, with a normal operation of the accelerator, proportional to the torque of the engine said torque being the resultant of the throttle opening and the engine speed. There is thus insured the desired acceleration of the vehicle under all driving conditions.

I claim:

1. In an automotive vehicle providing an accelerator, a friction clutch including driving and driven elements, and a transmission and clutch controlling shift lever, power means for effecting both an engagement and a disengagement of said clutch, said power means including a double-acting motor unit comprising two power elements and force transmitting means interconnecting said elements with the clutch, valve means, including an accelerator operated valve member, for controlling the operation of said motor unit, means for operating said valve means comprising a solenoid and means for controlling the operation of the solenoid including a switch operated by the aforementioned lever.

2. In an automotive vehicle provided with a carburetor and an accelerator, a friction clutch including driving and driven elements, and a transmission and clutch controlling shift lever, power means of itself effecting both an engagement and a disengagement of said clutch, said power means including a double-acting motor unit comprising two separate motors and valve means for controlling the operation of the two motors of said motor unit, said means including an accelerator operated valve member which also constitutes a part of the aforementioned carburetor and further including a solenoid operated three-way valve controlled in part by an operation of the aforementioned lever.

3. Clutch control mechanism for an automotive vehicle including in its power plant a carburetor, an accelerator, a friction clutch having driving and driven members and a transmission and clutch controlling shift lever; power means for effecting both a disengagement and an engagement of said clutch, said means including a double-acting motor unit operably connected to the clutch, valve means for controlling the operation of said motor unit including an accelerator operated valve member which also constitutes the throttle valve of the carburetor and also including a power operated three-way valve, means for operating the latter valve including a solenoid and means for controlling the operation of said solenoid including a switch operated by the aforementioned shift lever and further including a vehicle speed responsive governor operated switch.

4. In an automotive vehicle having a power plant comprising an accelerator, a carburetor, a vehicle speed responsive governor, a friction clutch having driving and driven members, and a transmission and clutch controlling shift lever, power means for effecting both an engagement and a disengagement of the clutch, said power means including a double-acting pressure differential and spring operated motor unit consisting of two separate motors each having a power element, force transmitting means interconnecting the driven element of the clutch with said power elements, valve means for controlling the operation of the two motors of said motor unit said valve means including the throttle valve of the carburetor and said valve means further including a solenoid operated three-way valve controlled by a switch operated by the shift lever and further controlled by a switch operated by the vehicle speed responsive governor.

5. In an automotive vehicle having a power plant comprising an accelerator, a carburetor, a vehicle speed responsive governor, a friction clutch having driving and driven members, and a transmission and clutch controlling shift lever, power means for effecting both an engagement and a disengagement of the clutch, said power means including a double-acting pressure differential and spring operated motor unit consisting of two separate motors each having a power element, force transmitting means, including a yieldable member which is compressed when the clutch is engaged, interconnecting the driven element of the clutch with said power elements, valve means for controlling the operation of the two motors of said motor unit said valve means including the throttle valve of the carburetor which is operative, with a normal operation of the accelerator, to control the operation of one of said motors and said valve means further including a solenoid operated three-way valve for controlling the operation of the other of said motors, said valve being controlled by a switch operated by the shift lever and further controlled by a switch operated by the vehicle speed responsive governor.

6. In an automotive vehicle provided with a power plant including an accelerator, a transmission and clutch controlling shift lever and a clutch having a driving member and a driven member including a friction mat at its outer periphery said latter member being so constructed and positioned with respect to the driving member that the friction mat is biased to a position slightly spaced from the outer periphery of the driving member; power means for moving the friction mat into engagement with the driving member to engage the clutch and for making possible a movement of said mat away from said driving member to disengage the clutch, said power means including a double-acting pressure differential and spring operated motor unit, valve means for controlling the operation of said motor unit and means for operating and controlling the operation of said valve means including a vehicle speed responsive governor, a switch operated by said governor and a switch operated by the aforementioned shift lever.

HAROLD W. PRICE.

REFERENCES CITED

The following references are of record in the file of this patent:

UNITED STATES PATENTS

| Number | Name | Date |
|---|---|---|
| 1,994,835 | Sanford et al. | Mar. 19, 1935 |
| 2,002,367 | Fahrney | May 21, 1935 |
| 2,084,380 | Bragg et al. | June 22, 1937 |
| 2,123,867 | Criley | July 19, 1938 |
| 2,129,358 | McCollum et al. | Sept. 6, 1938 |
| 2,130,848 | Kliesrath | Sept. 20, 1938 |
| 2,191,669 | Kress | Feb. 27, 1940 |
| 2,250,835 | Kliesrath et al. | July 29, 1941 |
| 2,294,823 | Andres | Sept. 1, 1942 |
| 2,341,587 | Andres et al. | Feb. 15, 1944 |